United States Patent [19]

Feurer

[11] 4,382,902
[45] May 10, 1983

[54] METHOD FOR MOLDING CONTACT LENSES USING ULTRAVIOLET ENERGY

[75] Inventor: Bernard Feurer, Saint-Orens-de-Gameville, France

[73] Assignee: Alcon Pharmaceuticals Limited, Cham, Switzerland

[21] Appl. No.: 238,962

[22] Filed: Feb. 27, 1981

[30] Foreign Application Priority Data

Feb. 28, 1980 [FR] France ................. 80 04750

[51] Int. Cl.³ ........................................... B29D 11/00
[52] U.S. Cl. .................................... 264/1.4; 264/25; 264/337; 425/808
[58] Field of Search .................. 264/1.4, 25, 337; 425/808

[56] References Cited

U.S. PATENT DOCUMENTS

| | | | |
|---|---|---|---|
| 3,171,869 | 3/1965 | Weinberg | 264/1.4 |
| 3,983,083 | 9/1976 | Kaetsu et al. | 264/1.4 |
| 4,073,577 | 2/1978 | Hofer | 264/1.4 |
| 4,113,224 | 9/1978 | Clark et al. | 264/1.4 |
| 4,166,088 | 8/1979 | Neefe | 264/1.4 |
| 4,209,289 | 6/1980 | Newcomb et al. | 425/410 |

FOREIGN PATENT DOCUMENTS 55-132221 10/1980 Japan ................. 264/1.4

Primary Examiner—James B. Lowe
Attorney, Agent, or Firm—Shlesinger, Arkwright, Garvey & Dinsmore

[57] ABSTRACT

The invention relates to a fabrication process for molding a contact lens evincing the required optical properties.

This method consists in designing a mold (1,2) with a high thermal inertia, transparent to, or little absorbing electromagnetic waves with wavelengths between 1 micron and $10^{-6}$ microns, in developing a base composition from polymerizing double-bond monomers which are absorbing with respect to these waves and in securing the polymerization of the composition inside the closed mold by irradiating with the above-cited electromagnetic waves at a power density such as to keep the temperature approximately less than 40° C. at the mold level.

11 Claims, 4 Drawing Figures

METHOD FOR MOLDING CONTACT LENSES USING ULTRAVIOLET ENERGY

The invention relates to a fabrication method for molding a contact lens which is a finished product with the required optical properties for placement on an eye and ensuring the desired corrections.

It is known that the contact lenses are conventionally made by machining blanks or disks obtained by polymerizing a synthetic monomeric composition; these disks or blanks as a rule are obtained by polymerizing in molds without there being any attending particular difficulties, as the optical surfaces are machined thereafter.

This machining of disks to impart the final shape with the required optical properties to the lenses represents a costly, delicate and lengthy operation, requiring numerous and specialized personnel. To eliminate this machining operation, it has already been suggested to directly produce by molding these contact lenses, by providing for the polymerization of the base composition in a closed mold which renders as a hollow the final shape of the lens to be obtained.

However this type of fabrication runs into a problem which is exceedingly difficult to resolve practically when desiring to achieve lenses of which the surfaces have the required optical properties and the rims are thin enough and of a proper contour to be physiologically supported by the eye. In fact, during the polymerization, which as a rule is carried out at a temperature of 60° to 70° C., detachments of the lens material from the mold are observed, with the formation of minute pockets between the lens and the mold walls. The lenses so made cannot be used, so that, regardless of their seeming interest, these molding methods to-date have failed to be commercially profitable.

The experts who have considered this problem have explained the lens detachment and the formation of pockets as a shrinkage phenomenon that would be experienced by the hot material during polymerization.

Thus, in the French patent application number 77.08393, there is an attempt to resolve this problem by designing a special mold provided with elastic lips around its periphery of which the function is to fill the empty space that tends to appear around the lens, in order to prevent lens detachment and the formation of pockets, as mentioned above.

A certain improvement is obtained, which reinforces the thesis that the difficulties are due to material shrinkage during polymerization.

However, the method described in the above cited patent application requires the design of special molds of which the very thin elastic lips are likelt to degrade rapidly. Moreover, and most of all, the rim of the lens made in such molds as a rule will be relatively thick and rather irregular. When emplaced, such lenses suffer from the drawback that they are frequently moved by the action of the lids catching on their rims.

Furthermore, in some methods, non-hermetic molds have been used, with open rims at their periphery, where these methods consist in pouring excess material, which can be drained through the open rims, into the molds (for instance French Pat. No. 2,270,082). However these methods require working the lenses again to machine their rims following molding. Also, in this kind of procedure, the molding implementation is far more complex and delicate, as the polymerization must take place progressively from the center to the rims of the mold. As a rule, the polymerizing conditions are so adjusted that it will take place in two phases, first an onset of polymerization at the center of the mold (during which polymerization of the rims is avoided), and then peripheral polymerization.

The object of the present invention is a fabrication method by molding, of the above cited type, wherein a base composition is polymerized in a hermetic mold consisting of two parts hermetically closing one against the other and rendering in hollow shape the form of the desired lens.

Another object of the invention is to solve the molding problem cited above, without the drawbacks of the known solutions.

Another object of the invention in particular is to allow fabrication in a single stage by molding a lens in a closed mold to obtain a lens with optical surfaces and thin rims, and appropriate properties.

Another object of the invention is to provide a method which can be implemented in simple-structure molds that do not risk rapid wear.

To that end, the fabrication method of this invention to make a corneal lens of suitable optical quality by polymerizing a base composition in a closed mold consists of:

designing a mold of a material which is transparent to or little absorbing the electromagnetic waves of a length approximately between 1 micron and $10^{-6}$ microns, where said mold has a thermal inertia much higher than that of the base composition amount required to make a lens;

developing a base composition from one or more polymerizing double-bond monomers, with the property of absorbing the above cited electromagnetic waves;

and securing the polymerization of the composition inside the closed mold by irradiating the set with electromagnetic waves with the above cited lengths and with a power density adjusted to maintain a temperature at the mold level which is less than approximately 40° C.

When implementing such a method, it is observed that the lens material remains applied against the mold and perfectly hugs its shape, both in the central regions and at the rim of the lens. Upon completion of the polymerization, the lens evinces an optically satisfactory surface, also and particularly regular rims which reproduce the undeforming geometry of the mold at that level. Due to a proper mold shape, these rims therefore may be slight in thickness, progressively decreasing in conformity with the requirements placed on the corneal lenses, and this result is reproducible in the course of mass moldings of lenses.

Very likely the explanation of this unexpected result is in the two following facts: on one hand, contrary to what was believed, the pocket formation in the conventional methods arises at least in part as much from the hot differential expansions of the mold and of the base composition as from latter's shrinkage, and on the other hand, the shrinkage of the base composition during a low-temperature polymerization by itself is insufficient to cause detachment.

The method of the invention results in the dissipation of the energy required to polymerize at the core of the lens material by avoiding heating it excessively, and especially by avoiding heating the mold, which practically absorbs no energy and has a high thermal inertia with respect to the lens material.

Under these conditions, substantial expansions in the mold are averted, and such are, it appears, one of the essential reasons for the difficulties met with in the conventional methods, while the lens material shrinkage becomes acceptable.

Preferably the irradiation is carried out using ultraviolet light in the 0.2 to 0.4 microns range. This range of wavelengths in practice draws on a commonplace type of equipment without any dangers to its users. Moreover, within this range of wavelengths, it is easy to select a material for the mold which is hardly absorbant, for instance a non-charged polymer such as polypropylene or polyethylene, while on the other hand numerous monomeric double-bond polymerizing compositions are absorbant with respect to these electromagnetic waves, in particular the allyl or vinyl monomers. If appropriate, this absorptivity can be increased by adding a photo-sensitizing agent such as benzoin, azobis isobutyronitrile etc. to the base composition.

Obviously the mold material must be compatible with the polymerizing base composition, that is, it must be perfectly neutral with respect to it.

The irradiation preferably is so carried out that the power density at the level of the set base-composition/-mold will be between $0.1 \times 10^{-3}$ and $100 \times 10^{-3}$ watt/cm$^3$.

As a rule this power level suffices to initiate the polymerization reaction and to suitably maintain it, while keeping everywhere a moderate temperature less than 40° C., and in particular between 10° and 30° C.

Preferably a monomer or a mixture of monomers with high-volume molecules will be selected to make up the base composition, in particular belonging to the following group: hydroxethyl methacrylate, hydroxypropyl methacrylate, hydroxyethyl acrylate, ethyleneglycol dimethacrylate, vinyl pyrrolidone, glycidyl methacrylate, methacrylamide bisphenol A dimethacrylate, bisphenol A bis (2 hydroxypropyl methacrylate). These monomers evince slight shrinkage in the course of low-temperature polymerization, thereby making possible a perfectly satisfactory lens quality.

The monomer, or the mixture of monomers making up the base composition can be mixed with linear polymers, whereby the shrinkage during polymerization is further reduced and the results of certain applications are improved. In particular the following linear polymers can be mixed: polyglycidyl methacrylate, polymethyl methacrylate, polyvinyl pyrrolidone.

It is possible to implement the method of the invention at atmospheric pressure and this also is the case as a rule to lower the cost of the required equipment. However it has been observed that an increase in pressure is a favorable factor and that in certain applications operation at the order of 2 to 10 bars is possible.

The mold being used in practice must involve a material mass at least 20 times the amount of the base composition required to make a lens in order to achieve satisfactory temperature control by thermal inertia. For instance, if the lens is 0.03 g, a two-part mold with a mass of 1 g in each part can be used. If appropriate, the external surface of the mold can be cooled by a moving fluid.

The description below is non-restricting in nature and provides several examples of implementation of the method of the invention which were carried out by means of equipment and a mold such as are schematically shown in the attached drawings.

Before discussing the specific implementing conditions of the examples, the nature of the equipment making possible this implementation and the conditions in the method which are common to the various examples will be first discussed.

The method described in the example is for the purpose of fabricating by molding hydrophilic contact lenses (or soft lenses) which after the molding will evince all the required (geometric, mechanical and optical) properties, without there being a need to machine them or undertake other finishing operations.

Figure 1:
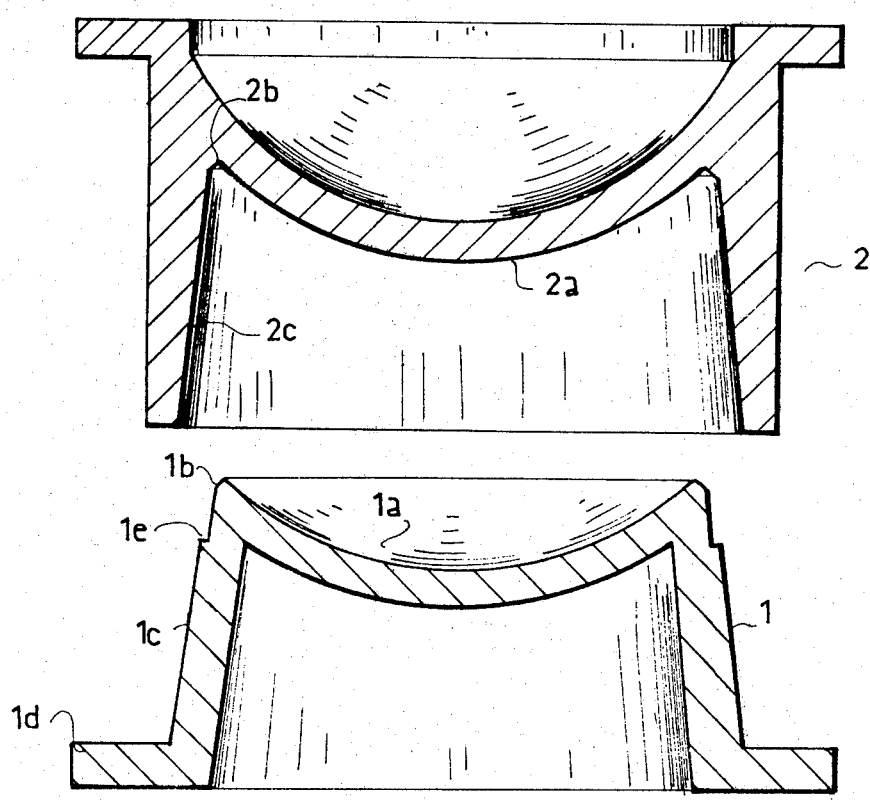
FIG. 1 is an axial section of the two mold parts, shown separated.

To that end a mold consisting of two parts 1 and 2 is used (FIG. 1). This mold is made from a material transparent to ultraviolet radiation and chemically inert to the base compositions generally used to make hydrophilic lenses (mixtures of allyl and vinyl monomers).

Moreover, the mold material must allow easy ejection of the lens; it must also permit obtaining a molding surface with a "mirror finish" grade of the optical quality demanded by the final lens.

As regards the examples below, the mold is made of pure, non-charged polypropylene, that is, it holds no additive at all that would be absorbant with respect to the radiation used. The two mold parts are obtained by injection molding; it is obvious that if appropriate the molds can also be machined and buffed and be obtained by any other process.

The part 1 represents a concave side 1a with a radius $R_a$ equal to the radius of the convex side of the lens to be made. This side 1a extends by a peripheral flat sector 1b sloping toward the outside.

On the outside, this part comprises a slightly conical wall 1c which stops at an elevation to form a peripheral recess 1e to receive the excess of the base composition that is forced out when the two mold parts complete their telescoping.

In the example, part 1 furthermore is hollowed out in its non-working volume to permit precise fabrication of the mold by means of injection. This part is supported by a small peripheral flange 1d.

The total diameter of this part is of the order of 15 mm and its weight is about 1 gram.

The purpose of the other mold part is to slip onto the first part 1 and its weight is about the same. It comprises a convex side 2a with a radiua $R_o$ equal to that of the concave side of the lens to be made.

This side 2a extends by a peripheral flat sector 2b conjugate to the flat sector 1b and coming to rest on latter.

This part 2 of the mold moreover comprises a conical wall 2c the shape of which is adjusted to come to rest against the wall 1c and to provide good hermeticity thanks to said rest being spread over a large surface.

Figure 2:
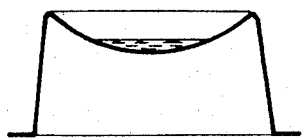
FIGS. 2 and 3 are schematic views illustrating the emplacement of the base composition in the mold.

At the onset of the operations, the base composition is arranged at a slight excess in the part 1 of the mold within the container bounded by the concave side 1a as indicated schematically by the FIG. 2.

The part 2 then is snugly slipped onto the part 1 until the peripheral flat sectors 1b and 2b and the conical walls 1c and 2c rest respectively against each other.

In the course of this operation, the excess of the base composition is forced out of the recess 1e. As a rule, the weight of the base composition remaining between the sides 1a and 2a does not exceed about 0.05 g for a hydrophilic lens of the common type.

Figure 3:
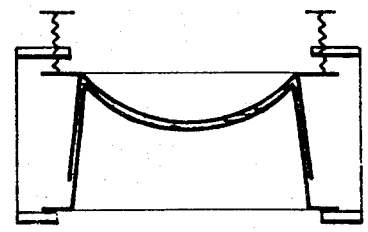
Figure 4:
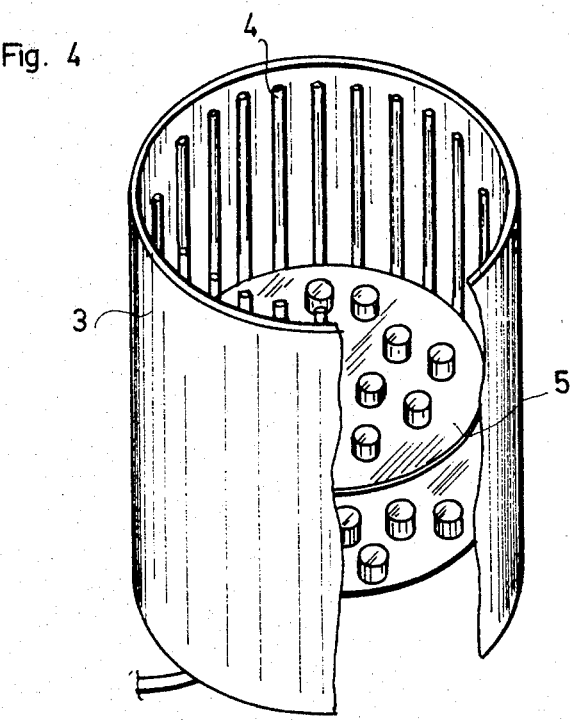
FIG. 4 is a schematic of irradiation equipment for implementing the method.

Next a clamping means is put into place to keep the two parts pressed one against the other (FIG. 3). Obviously this member is made of a non-absorbent material as regards the radiation used.

Now the set is ready for polymerization. A plurality of other molds prepared in the same manner is introduced together with the above set into an enclosure 3 on non-absorbant supports 5 (with respect to the radiation). This enclosure is provided with several mercury-vapor tubes 4 capable of ultraviolet radiation and a power density of the order of $13 \times 10^{-3}$ watt/cm$^3$ in the enclosure, the wavelength being of the order of 0.3 to 0.35 microns.

For all the examples described below, the time of polymerization was several hours (between 5 and 7 hours) and the temperature always remained at less than 40° C.

No pocket was observed between the mold and the polymerizing substance, and the lenses so obtained evinced optical and geometric properties which were wholly satisfactory. The polymer obtained at the end of the polymerization is remarkably homogeneous across the entire lens volume, whereby a highly favorable optical grade is obtained.

It should be noted that the molds are rigid and comprise no fragile part at all and they were used for numerous tests without apparent degradation.

The same tests were repeated with filament lamps, resulting in an irradiation wavelength of 0.36 microns and a power density of the order of $3.3 \times 10^{-3}$ watt/cm$^3$.

The polymerization times were longer (of the order of 7 to 9 hours). The lens quality is equivalent.

EXAMPLE 1

The base composition in the closed mold is the following:

| | | |
|---|---|---|
| hydroxyethyl methacrylate (Hema) | 72.18% | (by weight) |
| hydroxypropyl methacrylate (Hpma) | 23.75% | |
| hydroxyethyl acrylate (Hea) | 2.00% | |
| ethyleneglycol acrylate (Egdma) | 0.05% | |
| polyvinyl pyrrolidone (PVP) | 2.00% | |
| azobis isobutyronitrile (AIBN) | 0.016% | |

The ambient temperature was 20° C. The maximum temperature in the enclosure at the level of the mold was about 30° C. The polymerization lasted about 5 hours with the mercury vapor tubes and about 7 hours with the filament lamps.

The obtained material can absorb about 40% water (by weight, with respect to the final weight of the hydrated lens).

EXAMPLE 2

| | |
|---|---|
| vinyl pyrrolidone (VP) | 59.8% |
| glycidyl methacrylate (GMA) | 35% |
| methacrylamide (MC) | 5% |
| AIBN | 0.016% |
| Ambient temperature | 20° C. |
| Maximum temperature during polymerization | 25° C. |
| duration | 6 h (mercury tubes) |
| duration | 8 h (filament lamps) |
| finished lens absorbable water proportion | 70%. |

In this example, an air flow was applied to the base of the enclosure to keep it at 25° C.

EXAMPLE 3

| | |
|---|---|
| VP | 63.8% |
| GMA | 20.0% |
| polyglycidyl methacrylate (PGMA) | 16.0% |
| bisphenol A dimethacrylate (BPAD) | 0.20% |
| ambient temperature | 20° C. |
| maximum temperature during polymerization | 30° C. |
| duration | 5 h (mercury tubes) |
| duration | 7 h (filament lamps) |
| absorbable water proportion | 70% |

EXAMPLE 4

| | |
|---|---|
| VP | 59.8% |
| PGMA | 39.9% |
| BPAD | 9.1% |
| AIBN | 0.016% |
| ambient temperature | 20° C. |
| maximum temperature during polymerization | 30° C. |
| duration | 5 h (mercury vapor tubes) |
| duration | 7 h (filament lamps) |
| absorbable water proportion | 84% |

EXAMPLE 5

| | |
|---|---|
| VP | 60% |
| polymethyl methacrylate | 10% |
| Hpma | 30% |
| ambient temperature | 10° C. |
| maximum temperature during polymerization | 18° C. |
| duration | 7 h (mercury vapor tubes) |
| duration | 9 h (filament lamps) |
| absorbable water proportion | 73% |

It should also be noted that the Examples 3, 4 and 5 make use of advantageous materials as regards the method, as their cold shrinkages are very low due to the presence of linear polymers which themselves introduce no shrinkage at all. The Examples 1 and 2 make use of materials with more substantial shrinkage; however the initial volume of the molecule of these monomers is large enough to achieve satisfactory results, the cold shrinkage of these materials being compatible with making lens of suitable qualities, considering the absence of mold expansion in the course of the method.

Furthermore the hydrophilic lenses can be obtained in the dry state, in the partially hydrated state or in the wholly hydrated state by adding suitable amounts of water to the base composition.

Obviously, the method of the invention allows making non-hydrophilic lenses by suitably selecting the base monomers.

What is claimed is:

1. A method for producing a finished contact lens comprising:

providing a mold of male and female parts substantially transparent to electromagnetic energy within the range of wavelengths of about 1 micron to $10^{-6}$ micron, said mold having a heat capacity significantly greater than the amount of the composition being molded whereby heat generated during molding may be dissipated without raising the temperature of said mold above about 40° C., each said male and female part having a unitary mold surface rigid at temperatures below about 40° C., said parts being adapted to interfit with the peripheries of said mold surfaces in contact so as to form an airtight closed mold cavity, said unitary male mold surface and said unitary female mold surface alone forming in its entirety the final undeformed shape of the lens to be molded, introducing a polymerizable lens forming monomer into said mold cavity and interfitting said mold parts so as to close said mold cavity, irradiating said monomer containing mold substantially uniformly with electromagnetic energy at a wavelength within the range of about 1 micron to $10^{-6}$ micron and at a power density such as to keep the temperature of said mold below about 40° C. so as to polymerize said monomer without detachment of the lens material from said mold surfaces and without deformation of said mold surfaces, and removing the lens from said mold.

2. A method as in claim 1 and wherein said polymerizable lens forming monomer is selected from the group consisting of allyl monomers, vinyl monomers, or a mixture of allyl and vinyl monomers, and conducting said irradiation with electromagnetic energy at a wavelength of between about 0.2 to 0.4 microns.

3. A method as in claim 1 and wherein said mold is formed from a non-charged polymer selected from the group consisting of polypropylene and polyethylene, and carrying out said irradiation with electromagnetic energy at a wavelength of between about 0.2 to about 0.4 microns.

4. A method as in claim 1 and including adding a photosensitizing agent to said polymerizable monomer.

5. A method as in claim 1 and wherein one of said mold surfaces is concave so as to form the convex side of the lens, and the other of said mold surfaces is convex so as to form the other side of said lens.

6. A method as in claim 1, 2, 3 or 4 and wherein said polymerizable lens forming monomer is selected from the group consisting of hydroxyethyl methacrylate, hydroxypropyl methacrylate, hydroxyethyl acrylate, ethyleneglycol dimethacrylate, vinyl pyrrolidone, glycidyl methacrylate, methacrylamide, bisphenol A bis (2 hydroxypropyl methacrylate).

7. A method as in claim 1, 2, 3 or 4 and wherein said mold has a mass at least 20 times the mass of said polymerizable lens forming monomer in said mold cavity.

8. A method as in claim 6 and wherein said polymerizable lens forming monomer includes at least one linear polymer selected from the group consisting of polyglycidyl methacrylate, polymethyl methacrylate, polyvinyl pyrrolidone.

9. A method as in claim 6 and wherein said power density is between about $0.1 \times 10^{-3}$ and $100 \times 10^{-3}$ watt/cm$^3$.

10. A method as in claim 6 and including carrying out said irradiation step at substantially atmospheric pressure.

11. A method as in claim 6 and including carrying out said irradiation at a pressure of about 2 to 10 bars.

* * * * *